Feb. 15, 1944.  W. A. SCOTT  2,341,953
MILK TUBE
Filed May 26, 1942  2 Sheets-Sheet 1

WITNESS:

INVENTOR
Walter A. Scott
BY
ATTORNEYS.

Patented Feb. 15, 1944

2,341,953

UNITED STATES PATENT OFFICE 2,341,953

MILK TUBE

Walter A. Scott, Poughkeepsie, N. Y., assignor to The De Laval Separator Company, New York, N. Y., a corporation of New Jersey Application May 26, 1942, Serial No. 444,521

9 Claims. (Cl. 31—84)

My invention is an improvement in tubes, usually made of rubber, for conducting milk from the lower ends of a set of milking machine teat cups to a single multi-inlet cluster which is, in turn, connected by another tube with the milk receiving pail.

The main object of my invention is to increase the life of the milk tubes connecting the teat cups with the cluster by preventing injury to and puncturing of the milk tube by stresses and blows to which, in normal use, it is commonly subjected.

This object is effected by the construction herein described and illustrated in the drawings, in which—

Figure 1:
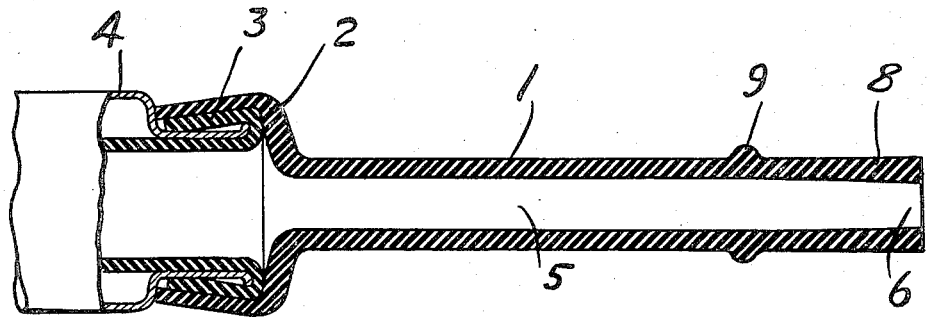
Fig. 1 is a cross-section of one of my improved milk tubes in its free, unstretched condition, applied to the lower end of a teat cup.
Figure 2:
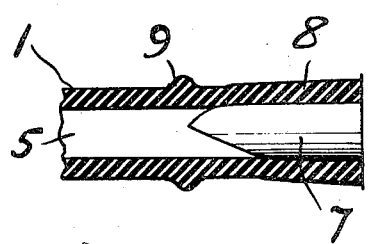
Fig. 2 is a cross-section of a nipple with one end of the milk tube applied thereto.
Figure 4:
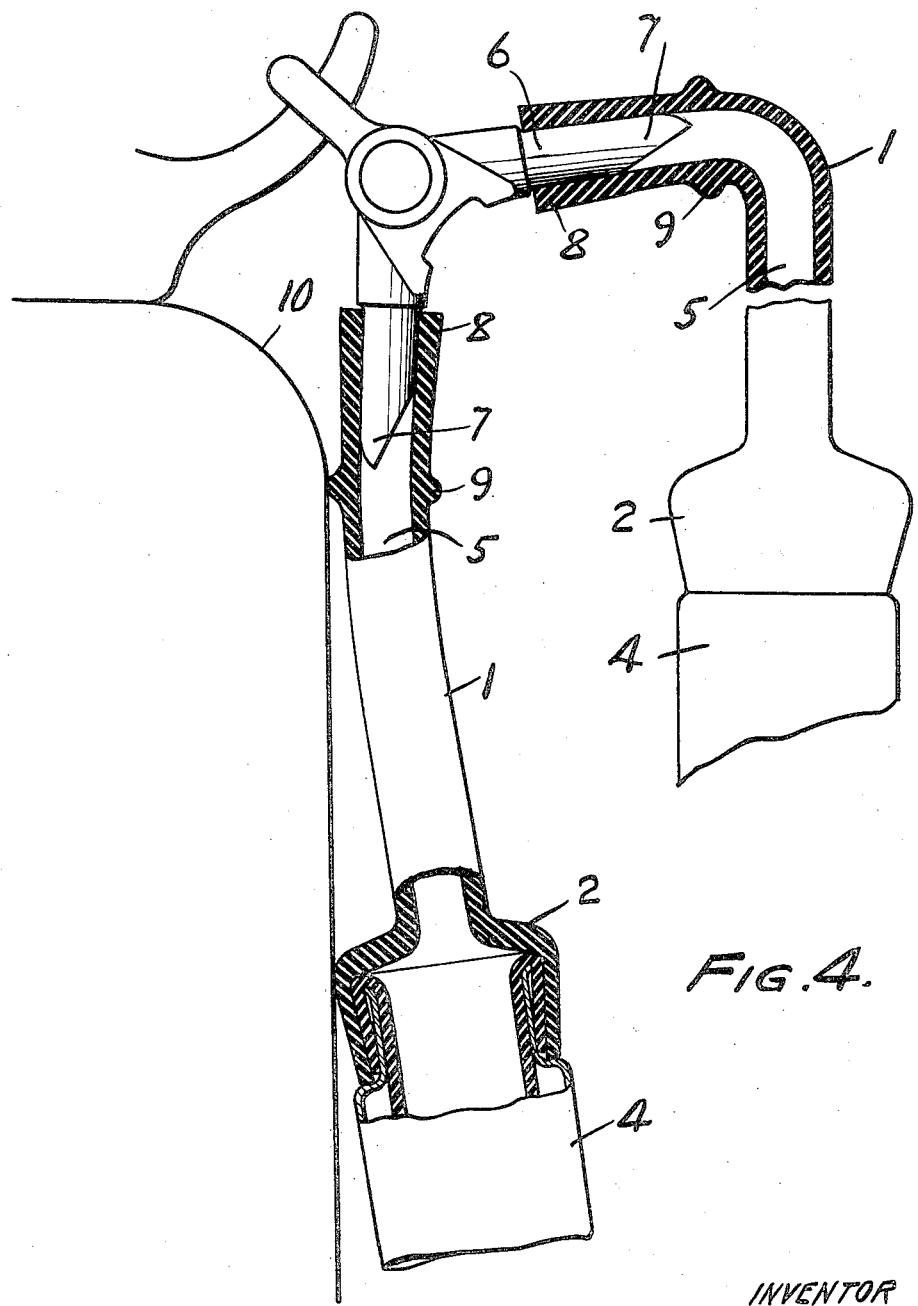
Fig. 4 is a side view of one side of a pail and cover having a hook, with a claw and cups hanging from the hook, the milk tubes and the lower end of one of the teat cups being shown in section.

The milk tube 1 may be at one end connected with the teat cup in any known manner. In Figs. 1 and 4 the milk tube is shown with an enlarged end 2 adapted to fit tightly around a teat cup liner 3, which is pulled through and turned around a reduced diameter lower end of a teat cup shell 4, as disclosed in the Scott Patent No. 2,219,945. As above stated, any other means may be provided for securing one end of the milk tube to the teat cup; or the milk tube may be formed integral with the liner.

The bore 5 in the body of the milk tube is about the same size as, or very slightly smaller than, the nipple 7 of the claw or cluster which the other end of the tube is adapted to engage. The inner wall of this end of the tube is tapered to a diameter substantially smaller than the outside diameter of the nipple; the reduction in bore size being effected by thickening the wall of the tube, as shown at 8. The combination of thickened wall and smaller bore causes the tube, when applied to the nipple, to grip it tightly and thus eliminate danger of leaks of air inward with resultant reduction of vacuum. The length of this tapered portion must not exceed the length of the nipple.

Figure 3:
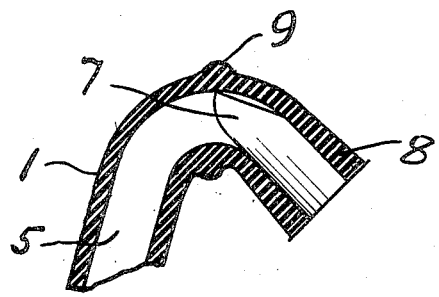
Fig. 3 is a cross-section of one milk nipple of a claw, in the position that an operator will hold it while putting teat cups on a cow, and a portion of a tube hanging from it.

Around the outside of the tube near but beyond its tapered end, at a distance from its extremity approximating the length of the nipple 7 (that is, at a location aligning with the end of the nipple after the tube is forced upon it), is a bead 9 having a height preferably greater than its radius (that is, a height greater than half its thickness at its base). The end of the nipple is cut at a customary angle, so that, when the teat cups are not in place on the teats of a cow and hang suspended from the nipples of the claw, as when the claw is in the position in which the operator holds it while applying the cups to the cow's teats, the open end of the nipple will be closed by the fairly sharp bending of the tube at that locality. The ordinary milk tube is of uniform thickness and diameter, and necessarily of a diameter substantially less than that of the nipple, in order to enable the tube to so tightly grip the nipples as to eliminate danger of its being accidently pulled off. When the milk tube assumes the position relative to the nipple shown in Fig. 3, there is some danger of a hole being punctured in the rubber at the point of contact between nipple and tube. The weakness of the tube at this point of contact is due not primarily to the bending of the tube but to the fact that the normal diameter of the tube at this point is so much smaller than the diameter of the outside of the tube that when the tube is forced on the nipple it is subject to considerable stretching. In my improvement the tube at this point is in unstretched or nearly unstretched condition, which, in connection with the localized thickening provided by the bead, effectually prevents puncturing of the tube at this point.

The most important function performed by the just described construction is to insure the tube against damage or puncture from light blows that occur when an operator places the eye, on the lower side of the cluster, around the hook, on the pail top, and allows the cluster and teat cups to fall from a nearly horizontal position to the nearly vertical position shown in Fig. 4. To such blows soft rubber, when stretched, is particularly susceptible. The bead 9, applied to a part of the tube which is not subjected to material stretching, will cushion the blow without damage to the tube.

By providing a tube whose inner diameter is not substantially less than the diameter of the nipple except adjacent its extremity for a distance not greater than the length of the nipple, so as to avoid substantial stretching of the tube except at its thickened extremity, not only is its susceptibility to damage materially lessened, but the application of the tube to the nipple and its removal therefrom are much easier operations than where the tube is of substantially uniform thickness and diameter.

What I claim and desire to protect by Letters Patent is:

1. A milk tube of flexible and elastic material adapted to convey milk from a milking machine teat cup to a cluster having a nipple to which the end of the milk tube is adapted to be applied, the tube, for a part of its length not greater than that of the nipple to which it is adapted to be applied, having a wall of increased thickness and reduced internal normal diameter adapted when applied to the nipple to be held thereon by its own tension and being provided with an external bead near but beyond said part of increased wall thickness and reduced internal diameter.

2. A milk tube of flexible and elastic material adapted to convey milk from a milking machine teat cup to a cluster having a nipple to which the end of the milk tube is adapted to be applied, the tube, for a part of its length not greater than that of the nipple to which it is adapted to be applied, having its wall tapered to an increased thickness and reduced in internal diameter toward its extremity, thereby enabling the tube to be so proportioned as to be readily forced upon the nipple and tightly grip it without substantial stretching of the tube in the neighborhood of the end of the nipple.

3. The combination with a milk claw having a nipple, of a tube of flexible and elastic material adapted to convey milk from a milking machine teat cup and having an end adapted to be forced over said nipple, said tube having, in the locality at a distance from its extremity corresponding to the length of the nipple, an inner diameter not materially less than the outer diameter of the nipple, said tube having adjacent its extremity and along a length thereof not exceeding the length of the nipple, a thickened wall and a reduced inner diameter, thereby when applied to the nipple being held thereon by its own tension and making an airtight connection therewith and avoiding substantial stretching in the neighborhood of the end of the nipple with consequent reduced liability thereat to puncture of the tube.

4. The combination with a milk claw having a nipple, of a tube of flexible and elastic material adapted to convey milk from a milking machine teat cup and having an end adapted to be forced over said nipple, said tube having, in the locality at a distance from its extremity corresponding to the length of the nipple, an inner diameter not materially less than the outer diameter of the nipple, said tube having adjacent its extremity and along a length thereof not exceeding the length of the nipple, a thickened wall and a reduced inner diameter, thereby, when applied to the nipple, being held thereon by its own tension, the wall of the tube being locally thickened at a distance from its extremity approximating the length of the nipple, thereby, when the tube is applied to the nipple, reinforcing the tube while in substantially unstretched condition at a locality thereof most liable to damage.

5. In a milking machine, the combination with a teat cup, a claw nipple and a milk tube connected at one end with the teat cup and having, at its other end, a portion, not longer than the nipple, of a normal inner diameter substantially less than the outside diameter of the nipple, thereby, when applied to the nipple, being held thereon by its own tension, the part of the tube adjacent to said portion and extending opposite and beyond the end of the nipple when the tube is applied thereto having an inner diameter approximating that of the nipple but not sufficiently less than that of the nipple to be in materially stretched condition when the tube is applied thereto, and a bead around the outside of the tube at a longitudinal location approximating that of the end of the nipple when the tube is applied thereto.

6. The combination with a milk claw having a nipple, of a tube of flexible and elastic material the body of which has an inner diameter, except at its nipple-engaging end, not substantially less than the diameter of the nipple, the tube having adjacent its extremity and along a length thereof not exceeding the length of the nipple, a thickened wall and a reduced inner diameter, being thereby held on the nipple, when applied thereto, by its own tension, the wall of the tube beyond said thickened wall, and at a locality thereof not subjected to substantial stretching when the tube is applied to the nipple, being locally thickened.

7. The combination with a milk claw having a nipple, of a tube of flexible and elastic material of an internal diameter beyond the nipple, when the tube is applied thereto, not substantially less than the diameter of the outside of the nipple, the nipple-engaging portion of the tube, along a length thereof not exceeding the length of the nipple, having its wall tapered toward its extremity to an increased thickness and to a reduced inner diameter substantially less than the outer diameter of the nipple, whereby, when the tube is applied to the nipple, the part thereof adjacent to and beyond the end of the nipple is in substantially unstretched condition.

8. The combination with a milk claw having a nipple, of a tube of flexible and elastic material of an internal diameter beyond the nipple, when the tube is applied thereto, not substantially less than the diameter of the outside of the nipple, the nipple-engaging portion of the tube, along a length thereof not exceeding the length of the nipple, having its wall tapered toward its extremity to an increased thickness and to a reduced inner diameter substantially less than the outer diameter of the nipple, whereby, when the tube is applied to the nipple, the part thereof adjacent to and beyond the end of the nipple is in substantially unstretched condition, the wall of the tube being provided with an external bead near but beyond said part of tapered wall thickness and reduced internal diameter.

9. A milk tube of flexible and elastic material adapted to convey milk from a milking machine teat cup to a cluster having a nipple to which the end of the milk tube is adapted to be applied, the tube, for a part of its length not greater than that of the nipple to which it is adapted to be applied, having its wall tapered to an increased thickness and reduced internal diameter toward its extremity and being provided with an external bead near but beyond said part of tapered wall thickness and reduced internal diameter.

WALTER A. SCOTT.